No. 679,713. Patented July 30, 1901.
J. M. WHITSON.
PLOW.
(Application filed Dec. 5, 1900.)
(No Model.)
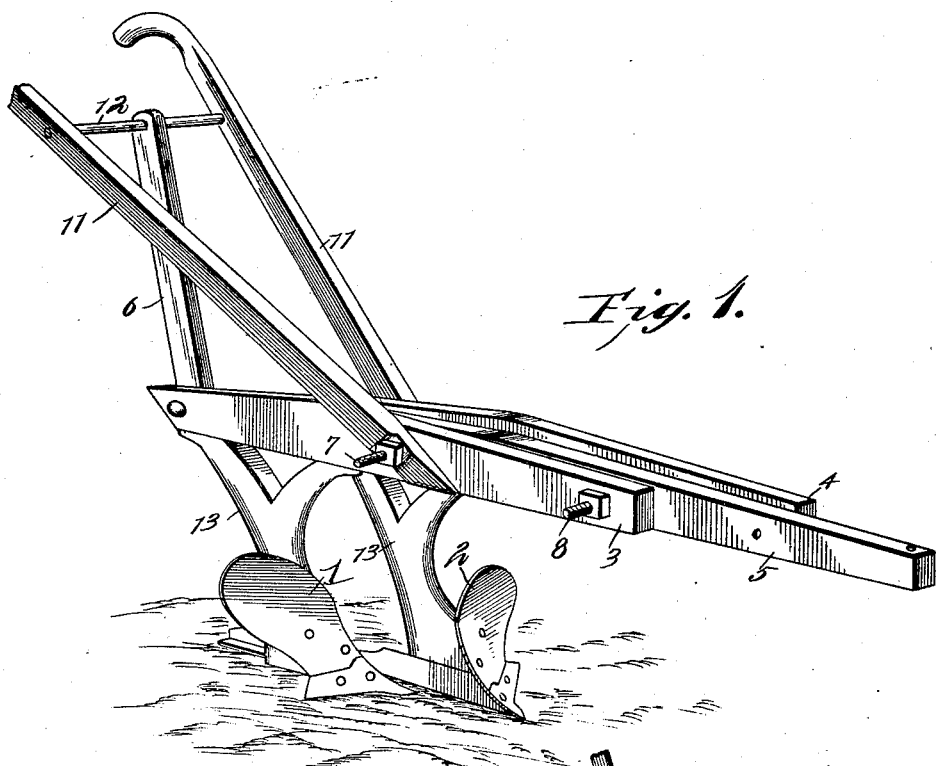
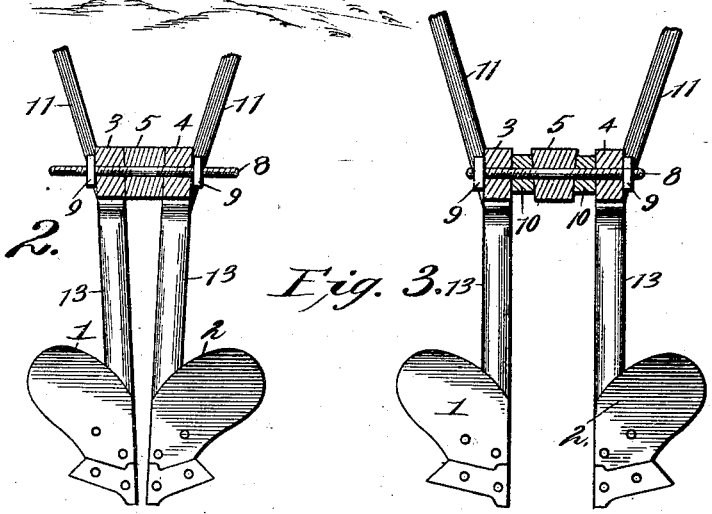
Witnesses
C. H. Walker
J. W. Garner
J. M. Whitson Inventor
by C. A. Snow & Co.
Attorneys

UNITED STATES PATENT OFFICE.

JAMES M. WHITSON, OF SOUTH MILLS, NORTH CAROLINA, ASSIGNOR OF ONE-HALF TO WILLOUGHBY LYNCH, OF WALLACETON, VIRGINIA.

PLOW.

SPECIFICATION forming part of Letters Patent No. 679,713, dated July 30, 1901.

Application filed December 5, 1900. Serial No. 38,799. (No model.)

*To all whom it may concern:*

Be it known that I, JAMES M. WHITSON, a citizen of the United States, residing at South Mills, in the county of Camden and State of North Carolina, have invented a new and useful Plow, of which the following is a specification.

My invention is an improved plow especially adapted for use in corn and other fields for leveling the ridges after the crop has been removed and in preparing the soil for seeding; and it consists in the peculiar construction and combination of devices, hereinafter fully set forth and particularly pointed out in the claim.

In the accompanying drawings, Figure 1 is a perspective view of my improved plow. Fig. 2 is a sectional view of the same, showing the reversed plows so adjusted as to operate in contiguous lines. Fig. 3 is a similar view showing the plows spaced laterally apart.

In the embodiment of my invention I employ a pair of right and left hand turning-plows 1 2, each of which has its beam 3 4 respectively disposed on opposite sides of a central draft-beam 5. To the rear end of the beam 5, on one side thereof, is attached a brace-standard 6. A pair of transversely-disposed bolt-rods 7 8 connect the beams 3, 4, and 5 together, and by means of nuts 9 and space blocks or collars 10 on said bolt-rods the beams 3 4 may be secured either directly against opposite sides of the beam 5 or spaced apart from said beam 5 to widen the space between the right and left hand plows, as may be required. The turning-plows are disposed one in advance of the other, and the landsides thereof are opposed to each other, so that the soil is thrown outward by the plows in opposite directions. A handle 11 is attached to each beam 3 4, and the upper portions of said handles are secured on a rung 12, with which the brace-standard 6 is provided.

It will be observed by reference to Figs. 2 and 3 of the drawings that the sides of the central beam 5 are inclined and converge downwardly, thereby slanting the standards 13 of the plows inward downwardly to compensate for the thickness of the beam 5 and dispose the landsides of the respective turning-plow practically in the same line.

For breaking down the ridges in a field the plows are disposed close together, as in Fig. 2, and in plowing between the ridges the plows are spaced apart, as in Fig. 3.

My improved plow is especially adapted for backing down, siding off, lacing, and topping in the cultivation of hay and other fields from which the crops have been removed.

Having thus described my invention, I claim—

A plow of the class described comprising a central draft-beam, having a brace-standard at its rear end, a pair of turning-plows, having their respective shares oppositely disposed and with their landsides opposed to each other, the beams of said turning-plows being disposed on opposite sides of said central draft-beam, transverse bolts connecting said beams together and adapting said turning-plows to be laterally adjusted to set them at any desired distance apart, and a handle attached to the beam of each turning-plow, said handles being secured on a rung with which the brace-standard of the central draft-beam is provided, substantially as described.

In testimony that I claim the foregoing as my own I have hereto affixed my signature in the presence of two witnesses.

J. M. WHITSON.

Witnesses:
 W. R. DOZIER,
 G. F. SPENCER.